(12) United States Patent
Tanaka

(10) Patent No.: US 8,724,949 B2
(45) Date of Patent: May 13, 2014

(54) OPTICAL FIBER, AND LASER DEVICE USING THE SAME

(71) Applicant: Fujikura Ltd., Tokyo (JP)

(72) Inventor: Hironori Tanaka, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/628,386

(22) Filed: Sep. 27, 2012

(65) Prior Publication Data

US 2013/0022326 A1 Jan. 24, 2013

Related U.S. Application Data

(63) Continuation of application No. PCT/JP2011/055778, filed on Mar. 11, 2011.

(30) Foreign Application Priority Data

Mar. 30, 2010 (JP) .................................. 2010-76825

(51) Int. Cl.
G02B 6/02 (2006.01)

(52) U.S. Cl.
USPC ........... 385/123; 385/124; 385/125; 385/126; 385/127; 385/128

(58) Field of Classification Search
USPC .................. 385/123, 124, 125, 126, 127, 128
See application file for complete search history.

(56) References Cited

U.S. PATENT DOCUMENTS

| | | | |
|---|---|---|---|
| 6,658,190 B2 * | 12/2003 | Hirano et al. | 385/124 |
| 2001/0017967 A1 | 8/2001 | Hirano et al. | |
| 2004/0005128 A1 | 1/2004 | DiGiovanni et al. | |
| 2006/0245708 A1 | 11/2006 | Seo et al. | |
| 2007/0122095 A1 * | 5/2007 | Broeng et al. | 385/125 |
| 2009/0041415 A1 * | 2/2009 | Tanobe et al. | 385/127 |

FOREIGN PATENT DOCUMENTS

| | | |
|---|---|---|
| CN | 1465991 A | 1/2004 |
| JP | 60-130404 U | 8/1982 |
| JP | 2004-170741 A | 6/2004 |
| WO | 00/62106 A1 | 10/2000 |
| WO | 2004/066007 A1 | 8/2004 |

OTHER PUBLICATIONS

International Search Report of PCT/JP2011/055778, mailing date of Apr. 5, 2011.

* cited by examiner

*Primary Examiner* — Jennifer Doan
(74) *Attorney, Agent, or Firm* — Westerman, Hattori, Daniels & Adrian, LLP

(57) ABSTRACT

The invention aims to provide an optical fiber in which light that is input to the clad is easily released to the outside of the clad, and a laser device using the optical fiber. An optical fiber (50) includes a core (51), and a clad (52) coating the core (51). The clad (52) includes a refractive-index varying region (56) in which the refractive index increases in the direction from the inner circumferential side toward the outer circumferential side. In this structure, even when light is input to the clad (52), the light that has reached the refractive-index varying region (56) of the clad (52) is refracted and propagates from the inner circumferential side toward the outer circumferential side of the clad (52). Accordingly, light that is input to the clad (52) is easily released to the outside of the clad (52).

9 Claims, 5 Drawing Sheets

OPTICAL FIBER, AND LASER DEVICE USING THE SAME

TECHNICAL FIELD

The invention relates to an optical fiber and a laser device using the optical fiber. More particularly, the invention relates to an optical fiber in which light that is input to the clad is easily released to the outside of the clad, and to a laser device using the optical fiber.

BACKGROUND ART

Fiber laser devices are used in the fields of processing machinery, medical equipment, measurement instruments, and the like, and light that is amplified by amplification optical fibers is output from the fiber laser devices. In such a fiber laser device, there are cases where light that is output from the core of the amplification optical fiber is input to the core of a delivery fiber, and propagates through the delivery fiber. After reaching a desired location, the light is output.

However, output light that is output from the delivery fiber might be reflected by an object to be processed or the like, and be input to the clad of the delivery fiber. Further, part of light that is input to the delivery fiber might leak into the clad due to axis misalignment or angle mismatch between the cores, a mode field difference, a core bend, or the like at the welded point. In that case, the light that is input to and propagates through the clad might be absorbed by the coating layer of the delivery fiber, and the coating layer might burn out.

Patent Document 1 listed below discloses a system in which light that is input to such a clad is released from an optical fiber. This system includes a member having a refractive index that is a negative temperature coefficient and conforms to the refractive index of the clad, and the outer peripheral surface of the clad of the optical fiber is coated with the member. Where light is input to and propagates through the clad, the light propagates toward the member, and is then removed from the clad.

CITATION LIST

Patent Document

[Patent Document 1] U.S. Pat. No. 7,349,596

SUMMARY OF THE INVENTION

Objects to be Achieved by the Invention

In the system disclosed in Patent Document 1 listed above, however, a long distance is required for light to propagate from the clad to the member coating the clad. Particularly, in a case where light propagates in a direction almost parallel to the longitudinal direction of the clad, a very long distance is required in releasing the light to the outside of the clad. Therefore, in this system, part of the optical fiber is bent inside the member, so as to facilitate the propagation of light from the clad to the member. Where the optical fiber is bent, however, light propagating through the core of the optical fiber might be lost due to leakage or the like.

In view of this, the invention aims to provide an optical fiber in which light that is input to the clad is easily released to the outside of the clad, and a laser device using the optical fiber.

Means for Achieving the Objects

To achieve the above object, one aspect of an optical fiber of the invention includes a core and a clad coating the core, and the clad includes a refractive-index varying region in which the refractive index increases in the direction from the inner circumferential side toward the outer circumferential side.

Light that propagates through an object has the property of being refracted from a region with a lower refractive index toward a region with a higher refractive index. Therefore, with such an optical fiber, light that has reached the refractive-index varying region of the clad is refracted and propagate from the inner circumferential side toward the outer circumferential side of the clad even in a case where part of light that is input to the core is input as the leak light to the clad or where part of light that is output from the core is input as reflected light to the clad. Accordingly, light that is input to the clad is easily released to the outside of the clad.

In the refractive-index varying region in the above described optical fiber, the refractive index preferably increases gradually.

With such an optical fiber, there are no sharp changes in refractive index difference in the radial direction of the optical fiber in the refractive-index varying region of the clad. Accordingly, light that has reached the refractive-index varying region is hardly reflected toward the inner circumference of the clad. Thus, light that has reached the refractive-index varying region of the clad can be effectively released to the outside of the clad.

Alternatively, in the refractive-index varying region in the above described optical fiber, the refractive index preferably increases in a stepwise fashion.

With such an optical fiber, when the preform for the optical fiber is manufactured, there is no need to perform fine control on the portion to be the refractive-index varying region by gradually changing the amount of the dopant to be added for varying the refractive index in the direction from the inner circumferential side toward the outer circumferential side. Accordingly, controlling the refractive index becomes easier, and the optical fiber in which the clad has the refractive-index varying region can be easily manufactured.

In the refractive-index varying region in the above described optical fiber, the amount of change in the refractive index per unit length in the radial direction is preferably larger on the inner circumferential side than on the outer circumferential side.

Light that propagates on the inner circumferential side of the clad needs to travel a longer distance in the radial direction of the optical fiber than light that propagates on the outer circumferential side of the clad. Otherwise, the light propagating on the inner circumferential side will not be released to the outside of the clad. Therefore, in such an optical fiber, light propagating on the inner circumferential side is more sharply refracted than light propagating on the outer circumferential side, so that the light propagating on the inner circumferential side requires a shorter distance to be released to the outside of the clad. Accordingly, light that is input to the clad requires a shorter total distance to be released to the outside of the clad.

In the above described optical fiber, all the region of the clad is preferably the refractive-index varying region.

With such an optical fiber, all light that is input to the clad can be refracted toward the outer circumferential side. Accordingly, light that is input to the clad can be more efficiently released.

Alternatively, in the above described optical fiber, the refractive index is preferably constant in a predetermined region in the clad, the predetermined region being adjacent to the core.

In such an optical fiber, the refractive index in the region of the clad adjacent to the core is constant. Accordingly, light propagating through the core can be prevented from being attracted toward the outer circumferential side of the clad and leaking into the clad.

Further, in the above described optical fiber, all the region of the clad other than the predetermined region is preferably the refractive-index varying region.

In such an optical fiber, light propagating through the core can be prevented from being attracted toward the outer circumferential side of the clad and leaking into the clad. Further, all light that is input to the region of the core other than the predetermined region adjacent to the core can be refracted toward the outer circumferential side of the clad.

In the above described optical fiber, at least part of the outer peripheral surface near at least one end of the clad is coated with a light releasing member having a refractive index equal to or higher than the refractive index of the outer circumferential side of the clad.

In such an optical fiber, when light that is input to the clad through one end reaches the outer peripheral surface of the clad in the vicinity of the one end, the light that had reached the outer peripheral surface easily propagates from the clad to the light releasing member. Accordingly, light that is input to the clad can be more efficiently released to the outside of the clad.

Further, in the above described optical fiber, the light releasing member is preferably connected to a heat converting member.

With such an optical fiber, light that has reached the light releasing member can be absorbed by the heat converting member and can be converted into light. Accordingly, unnecessary release of light into open space can be restrained.

A laser device of the invention includes the above described optical fiber, and output light propagates through the optical fiber.

In such a laser device, output light can propagate through the optical fiber. When leak light or reflected light is input to the clad, the light does not need to travel a long distance before being released to the outside of the clad.

Effect of the Invention

As described above, the invention is to provide an optical fiber in which light that is input to the clad is easily released to the outside of the clad, and a laser device using the optical fiber.

EMBODIMENTS OF THE INVENTION

Preferred embodiments of optical fibers and laser devices using the optical fibers according to the invention will be described in detail below with reference to the accompanying drawings.

First Embodiment

Figure 1:
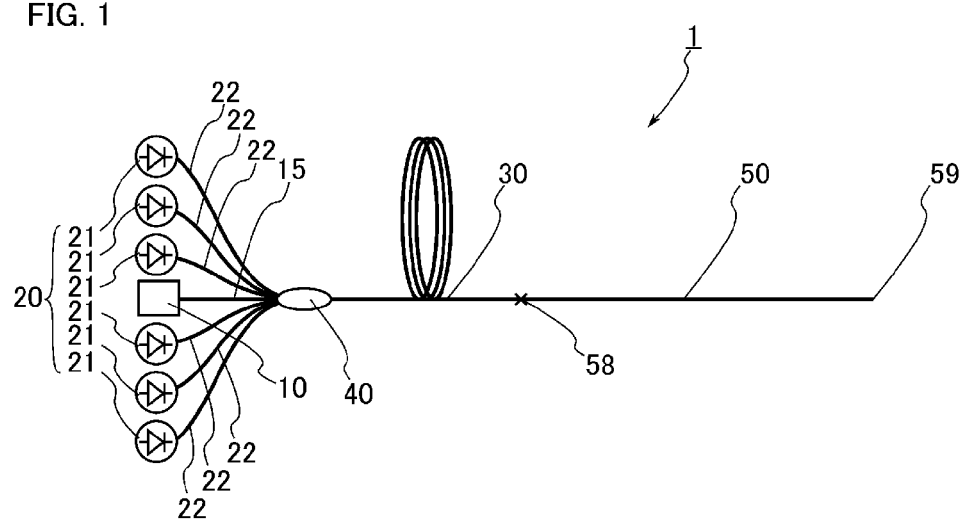
FIG. 1 is a diagram showing a laser device according to a first embodiment of the invention.

FIG. 1 is a diagram showing a laser device according to a first embodiment of the invention.

As shown in FIG. 1, a laser device 1 is a fiber laser device that includes as main components: a seed light source 10 that outputs seed light; a pumping light source 20 that outputs pumping light; an amplification optical fiber 30 to which the seed light and the pumping light are input; a combiner 40 that connects the seed light source 10 and the pumping light source 20 to the amplification optical fiber 30; and an optical fiber (hereinafter referred to as the delivery fiber) 50 having one end connected to the amplification optical fiber 30.

The seed light source 10 is formed with a laser light source including a laser diode, or with a fiber laser device of a Fabry-Perot type or a fiber ring type, for example. The seed light output from the seed light source 10 is not particularly limited, but may be laser light with a wavelength of 1070 nm, for example. The seed light source 10 is connected to a seed light propagation fiber 15 formed with a core and a clad coating the core. The seed light output from the seed light source 10 propagates through the core of the seed light propagation fiber 15. The seed light propagation fiber 15 may be a single-mode fiber, for example. In that case, the seed light propagates as single-mode light through the seed light propagation fiber 15.

The pumping light source 20 is formed with laser diodes 21. In a case where the wavelength of the seed light is 1070 nm as described above, the pumping light source 20 outputs pumping light with a wavelength of 915 nm, for example. The respective laser diodes 21 of the pumping light source 20 are connected to pumping light propagation fibers 22, and the pumping light output from the laser diodes 21 propagates through the pumping light propagation fibers 22. The pumping light propagation fibers 22 may be multi-mode fibers, for example. In that case, the pumping light propagates as multi-mode light through the pumping light propagation fibers 22.

Figure 2:
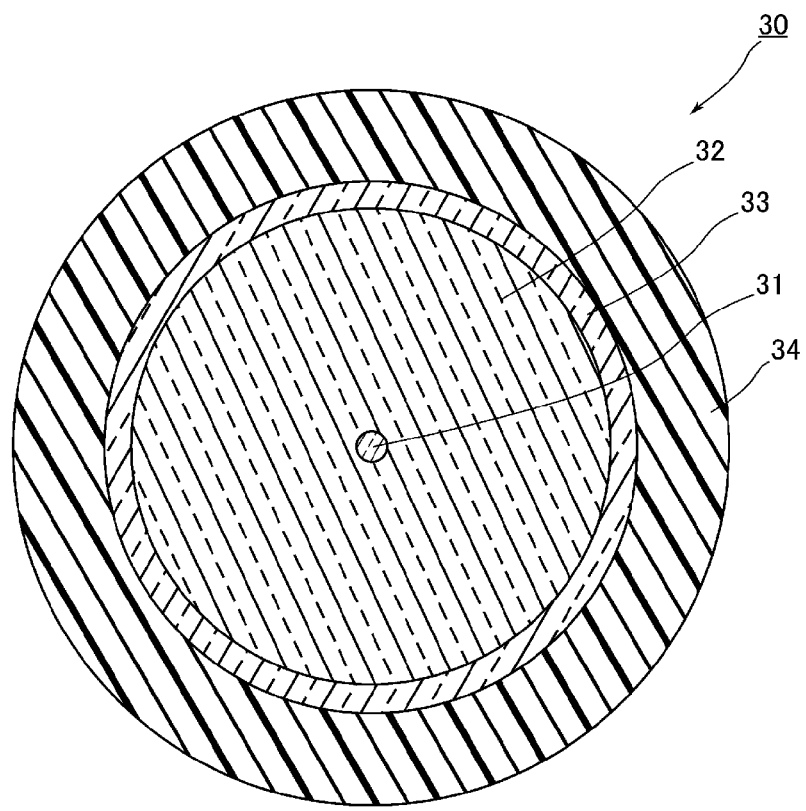
FIG. 2 is a diagram showing a cross-sectional view of the amplification optical fiber of FIG. 1, taken along a line perpendicular to the longitudinal direction thereof.

FIG. 2 is a diagram showing a cross-sectional view of the amplification optical fiber 30 taken along a line perpendicular to the longitudinal direction thereof. As shown in FIG. 2, the amplification optical fiber 30 includes a core 31, a clad 32 coating the core 31, a plastic clad 33 coating the clad 32, and a coating layer 34 coating the plastic clad 33. The refractive index of the clad 32 is lower than the refractive index of the core 31, and the refractive index of the plastic clad 33 is even lower than the refractive index of the clad 32. The diameter of the core 31 is 15 m, for example, and the outer diameter of the clad 32 is 400 m, for example. The material forming the core 31 may be silica doped with an element such as germanium, which increases the refractive index, or with an active element such as ytterbium (Yb), which is pumped by the pumping light output from the pumping light source 20. Such an active element may be a rare-earth element, and the rare-earth element may be thulium (Tm), cerium (Ce), neodymium (Nd), europium (Eu), erbium (Er), or the like, other than the above mentioned Yb. Other than the rare-earth element, the active element may be bismuth (Bi) or the like. The material forming the clad 32 may be pure silica not doped with any dopant, for example. The material forming the plastic clad 33 may be an ultraviolet curable resin, for example, and the material forming the coating layer 34 may be an ultraviolet curable resin different from the resin forming the plastic clad 33, for example.

The combiner 40 connects the seed light propagation fiber 15 and the respective pumping light propagation fibers 22 to the amplification optical fiber 30. Specifically, at the combiner 40, the core of the seed light propagation fiber 15 is end-connected to the core 31 of the amplification optical fiber 30. Further, at the combiner 40, the core of each of the pumping light propagation fibers 22 is end-connected to the clad 32. Accordingly, the seed light output from the seed light source 10 is input to the core 31 of the amplification optical fiber 30, and the pumping light output from the pumping light source 20 is input to the clad 32 of the amplification optical fiber 30.

Figure 3A:
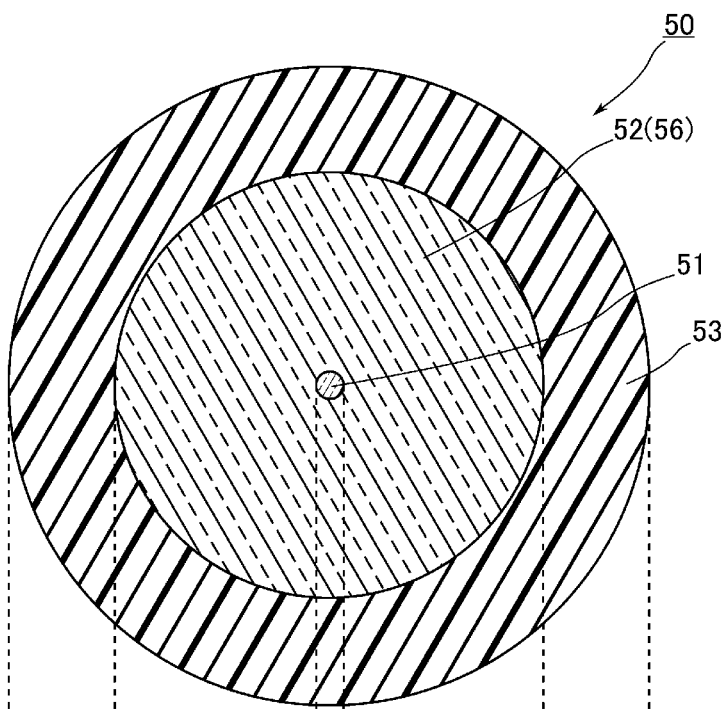
FIG. 3A and FIG. 3B are a diagram showing a cross-sectional view of the delivery fiber of FIG. 1, taken along a line perpendicular to the longitudinal direction thereof.
Figure 3B:
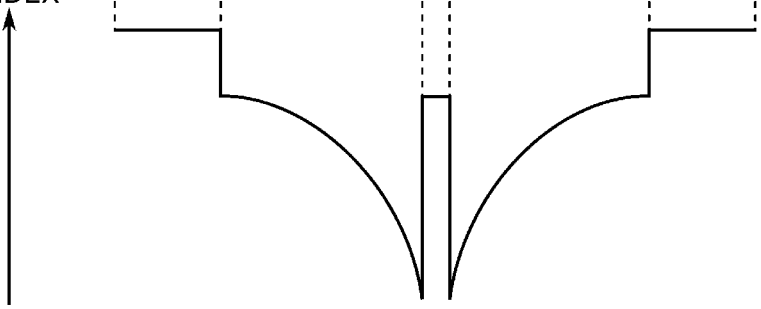

FIG. 3A and FIG. 3B are a diagram showing a cross-sectional view of the delivery fiber 50 of FIG. 1, taken along a line perpendicular to the length direction thereof. Specifically, FIG. 3A shows a cross-sectional view of the delivery fiber 50 taken along a line perpendicular to the length direction, and FIG. 3B shows the refractive index in the diametrical direction of the delivery fiber 50.

As shown in FIG. 3A, the delivery fiber 50 includes a core 51, a clad 52 coating the core 51, and a coating layer 53 coating the clad 52. The diameter of the core 51 is 15 m, for example, and the outer diameter of the inner clad 52 is 400 m, for example.

As shown in FIG. 3B, the refractive index of the clad 52 is lower than that of the core 51 at least on the inner circumferential side. In this embodiment, all the region of the clad 52 in cross-section is a refractive-index varying region in which the refractive index varies. In this refractive-index varying region 56, the refractive index increases gradually in the direction from the inner circumferential side of the clad 52 toward the outer circumferential side, and the line representing the refractive index along the radius of the clad 52 is sloped. The amount of change in refractive index per unit length in the radial direction is larger on the inner circumferential side than on the outer circumferential side of the refractive-index varying region 56. Accordingly, the refractive index greatly increases on the inner circumferential side, and increases at a lower rate on the outer circumferential side than on the inner circumferential side. The refractive index of the coating layer is higher than the refractive index of the outer circumferential side of the clad 52.

The material forming the core 51 of the delivery fiber 50 may be silica doped with an element such as germanium, which increases the refractive index, for example. The material forming the clad 52 may be silica that is not doped with any dopant on the inner circumferential side, but is doped with an element such as germanium, which increases the refractive index, on the outer circumferential side. The amount of the element increases in the direction from the inner circumferential side toward the outer circumferential side. The material forming the coating layer 53 may be an ultraviolet curable resin, for example.

The preform for the delivery fiber 50 can be manufactured by PCVD, VAD, or the like. In a case where the preform is manufactured by PCVD, for example, a silica raw material gas containing a dopant such as Ge is introduced into a high-refractive-index silica tube doped with a dopant such as Ge, so that silica doped with a dopant is deposited. The amount of the dopant was gradually reduced in the direction toward the inner circumferential side, and silica that is not doped with any dopant is deposited in the end. In this manner, the clad portion of the preform for the delivery fiber 50 is completed. After that, the clad portion is combined with the core portion of the preform for the delivery fiber 50. The core portion is doped with a dopant such as Ge. The combined material is then collapsed, to form the preform for the delivery fiber 50. The preform is then subjected to fiber spinning, and the coating layer 53 is formed, to obtain the delivery fiber 50.

Figure 4:
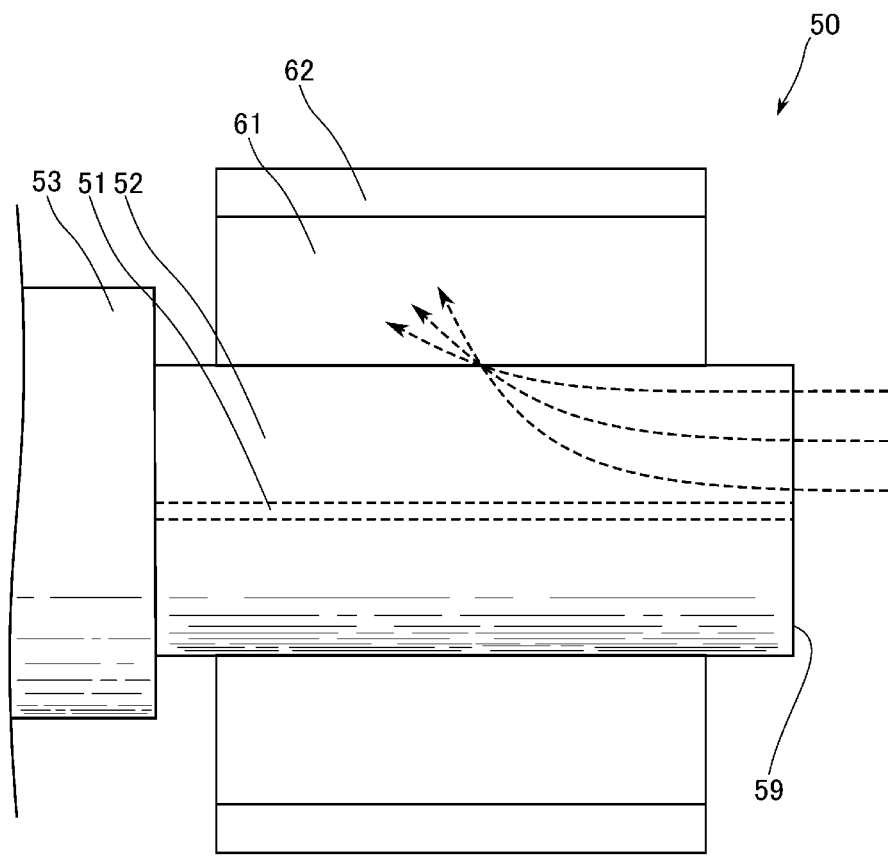
FIG. 4 is a diagram showing the output end of the delivery fiber of FIG. 1.

One end of the delivery fiber 50 is connected to the amplification optical fiber 30 as described above, and serves as an input end 58. As shown in FIG. 1, the other end is not connected to anything, and serves as an output end 59. FIG. 4 is a diagram showing the output end 59 of the delivery fiber 50. As shown in FIG. 4, the coating layer 53 is removed in the vicinity of the output end 59. At least part of the outer peripheral surface of the clad 52 is coated with a light releasing member 61, and the light releasing member 61 is connected to a heat converting member 62. The light releasing member 61 is made of a material having a refractive index equal to or higher than the refractive index of the clad 52. Such a material may be a high-refractive-index silicon resin, for example. The heat converting member 62 is not particularly limited, as long as it is made of a material that can convert light into heat. However, a material that excels in heat release characteristics is preferable, and the heat converting member 62 may be made of a metal such as stainless steel, for example.

Next, operations of the laser device 1 are described.

First, seed light is output from the seed light source 10, and pumping light is output from the pumping light source 20. The seed light output from the seed light source 10 at this point has a wavelength of 1070 nm as described above, for example. The seed light output from the seed light source 10 propagates through the core of the seed light propagation fiber 15, and is input to the combiner 40.

Meanwhile, the pumping light output from each of the laser diodes 21 of the pumping light source 20 has a wavelength of 915 nm as described above, for example. The pumping light output from the respective laser diodes 21 propagates through the pumping light propagation fibers 22, and is input to the combiner 40.

The seed light that is input to the combiner 40 in the above manner is then input to the core 31 of the amplification optical fiber 30, and propagates through the core 31. Meanwhile, the pumping light that is input to the combiner 40 is then input to the clad 32 of the amplification optical fiber 30, and propagates mainly through the clad 32.

When the pumping light passes through the core 31 in the amplification optical fiber 30, the pumping light is absorbed by the active element with which the core 31 is doped, and the active element is pumped. The pumped active element then causes stimulated emission, and the seed light is amplified by the stimulated emission and is output as output light from the other end 39 of the amplification optical fiber 30.

The output light that is output from the core 31 of the amplification optical fiber 30 is input to the core 51 through the input end 58 of the delivery fiber 50, propagates through the core 51, and is output from the output end 59 of the delivery fiber 50.

There are cases where the output light that is output from the output end 59 is reflected by an object to be processed or the like, and is input to the clad 52 as indicated by the dashed lines in FIG. 4. In such cases, the reflected light that is input to the clad 52 is refracted toward the region with a higher refractive index, since the entire clad 52 serves as the refractive-index varying region 56. That is, the reflected light that is input to the clad 52 propagates through the clad from the inner circumferential side toward the outer circumferential side of the clad 52, while being refracted. In this embodiment, the amount of change in refractive index per unit length in the radial direction is larger on the inner circumferential side than on the outer circumferential side of the refractive-index varying region 56. Therefore, the reflected light input to the inner circumferential side of the clad 52 is more sharply refracted than the reflected light input to the outer circumferential side, and propagates toward the outer circumferential side, as shown in FIG. 4. The reflected light that has reached the outer peripheral surface of the clad 52 is then released from the light releasing member 61, and is converted into heat by the heat converting member 62. In this manner, the reflected light vanishes.

As described above, in the laser device 1 of this embodiment, even when part of light that is output from the core 51 is input as reflected light to the clad 52, the reflected light is refracted from the inner circumferential side to the outer circumferential side of the clad 52, while propagating. Accordingly, the light that is input to the clad 52 can be easily released to the outside of the clad 52. Thus, reflected light that is input to the clad 52 does not propagate over a long distance, and can be released to the outside of the clad 52.

Since the refractive index gradually increases in the direction from the inner circumferential side toward the outer circumferential side, there are no sharp changes in refractive index difference in the radial direction of the delivery fiber 50 in the refractive-index varying region 56. Accordingly, light that has reached the refractive-index varying region 56 is hardly reflected toward the inner circumference of the clad 52. Thus, light that has reached the refractive-index varying region 56 can be effectively released to the outside of the clad 52.

In the laser device 1 of this embodiment, the entire clad 52 of the delivery fiber 50 serves as the refractive-index varying region 56, and accordingly, all reflected light that is input to the clad can be refracted toward the outer circumferential side.

Furthermore, in the refractive-index varying region 56, the amount of change in refractive index per unit length in the radial direction is larger on the inner circumferential side than on the outer circumferential side. Accordingly, reflected light that propagates on the inner circumferential side of the clad can be more sharply refracted than reflected light that propagates on the outer circumferential side, and the total distance required in releasing the light can be shortened.

In this embodiment, light that has been reflected by the output end 59 is input to the clad 52 can be released to the outside of the clad 52 in the same manner as light that is reflected by an object to be processed or the like and is input to the clad 52.

Furthermore, in this embodiment, leak light can be refracted and propagate from the inner circumferential side toward the outer circumferential side of the clad 52 even in a case where part of light that is input from the amplification optical fiber 30 leaks as the leak light into the clad 52 at the input end 58 due to axis misalignment or angle mismatch between the cores, a mode field difference, a core bend, or the like at the welded point. Accordingly, the leak light that is input to the clad 52 does not propagate over a long distance, and can be released to the outside of the clad 52. Therefore, in the vicinity of the input end of the clad 52, the coating layer 53 is preferably removed, and at least part of the outer peripheral surface of the clad 52 is preferably coated with the same light releasing member as the light releasing member 61 provided at the output end 59. Further, this light releasing member is preferably connected to a heat converting member.

Second Embodiment

Figure 5A:
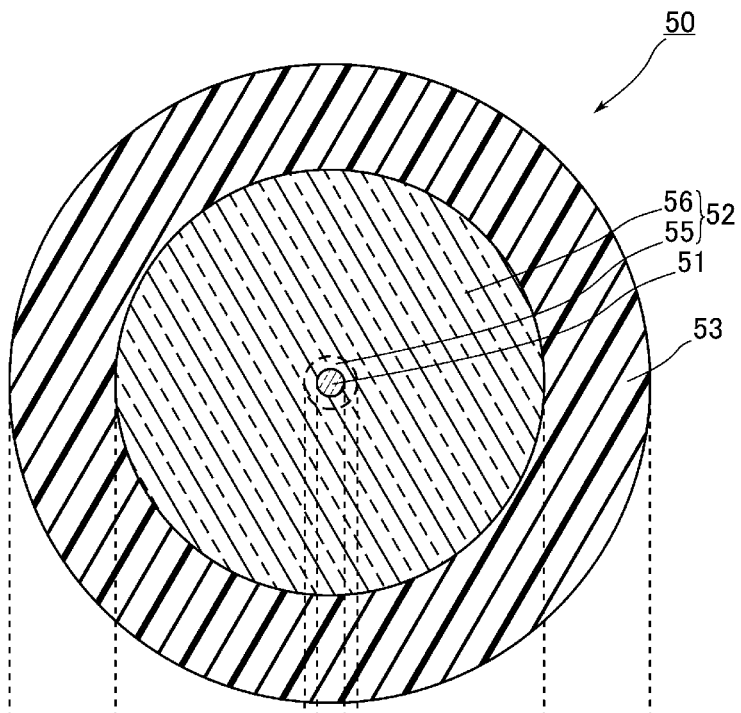
FIG. 5A and FIG. 5B are a diagram showing a cross-sectional view of the delivery fiber in a laser device according to a second embodiment of the invention, taken along a line perpendicular to the longitudinal direction of the delivery fiber.
Figure 5B:
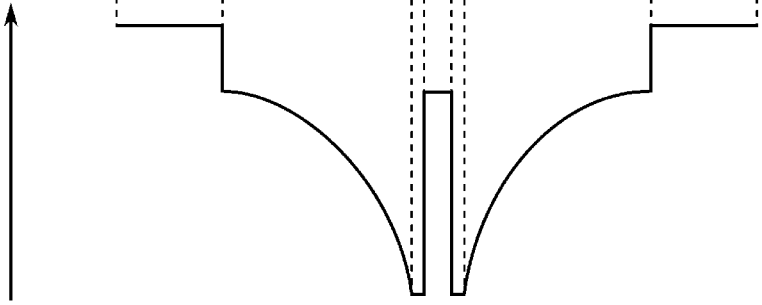

Referring now to FIG. 5A and FIG. 5B, a second embodiment of the invention is described in detail. It should be noted that components that are identical or similar to those in the first embodiment are denoted by the same reference numerals as those used in the first embodiment, and the same explanation will not be repeated. FIG. 5A and FIG. 5B are a diagram showing a cross-sectional view of the delivery fiber in a laser device according to the second embodiment of the invention, taken along a line perpendicular to the longitudinal direction of the delivery fiber. Specifically, FIG. 5A shows a cross-sectional view of the delivery fiber 50 taken along a line perpendicular to the length direction, and FIG. 5B shows the refractive index in the diametrical direction of the delivery fiber 50.

As shown in FIG. 5A and FIG. 5B, the laser device of this embodiment differs from the laser device of the first embodiment in that, in the clad 52 of the delivery fiber 50, the refractive index in a predetermined region 55 adjacent to the core 51 is constant, and all the region other than the predetermined region 55 serves as the refractive-index varying region 56.

In the laser device of this embodiment, the refractive index is constant in the predetermined region 55 adjacent to the core 31 in the clad 52. Accordingly, light propagating through the core 51 can be prevented from being attracted toward the outer circumferential side of the clad 52 and leaking into the clad 52.

Therefore, the diameter of the predetermined region 55 is preferably about 2.5 or more times larger than the mode field diameter of light propagating through the core 51 so that the light propagating through the core 51 can be more effectively prevented from leaking into the clad 52.

Third Embodiment

Figure 6A:
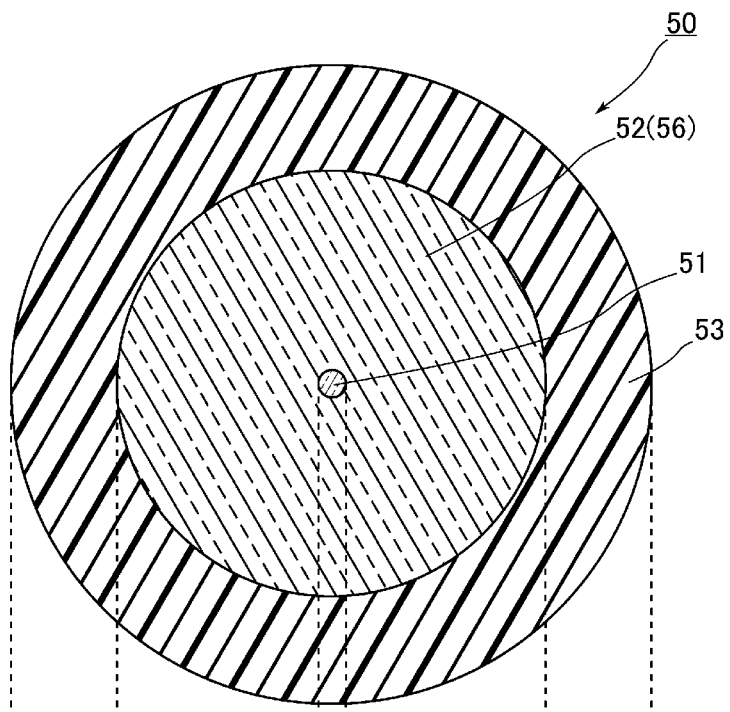
FIG. 6A and FIG. 6B are a diagram showing a cross-sectional view of the delivery fiber in a laser device according to a third embodiment of the invention, taken along a line perpendicular to the longitudinal direction of the delivery fiber.
Figure 6B:
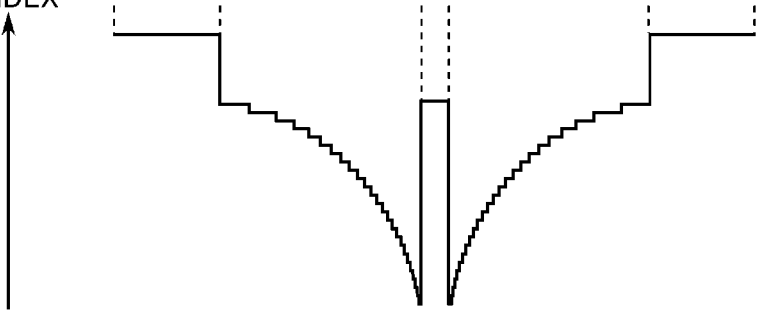

Referring now to FIG. 6A and FIG. 6B, a third embodiment of the invention is described in detail. It should be noted that components that are identical or similar to those in the first embodiment are denoted by the same reference numerals as those used in the first embodiment, and the same explanation will not be repeated. FIG. 6A and FIG. 6B are a diagram showing a cross-sectional view of the delivery fiber in a laser device according to the third embodiment of the invention, taken along a line perpendicular to the longitudinal direction of the delivery fiber. Specifically, FIG. 6A shows a cross-sectional view of the delivery fiber 50 taken along a line perpendicular to the length direction, and FIG. 6B shows the refractive index in the diametrical direction of the delivery fiber 50.

As shown in FIG. 6A and FIG. 6B, the laser device of this embodiment differs from the laser device of the first embodiment in that the entire clad 52 of the delivery fiber 50 serves as the refractive-index varying region 56, the refractive index increases in a stepwise fashion in the direction from the inner circumferential side toward the outer circumferential side of the clad 52, and the line representing the refractive index in the radial direction of the clad 52 exhibits a stepwise pattern. The amounts of the stepwise changes in refractive index are preferably constant at the respective boundaries between the steps. That is, the refractive index differences at the boundaries between the steps are preferably constant. With this arrangement, the boundaries with large refractive index differences are eliminated, and light reflection from the outer circumferential side toward the inner circumferential side of the clad 52 can be restrained at the boundaries between the steps at which the refractive index varies.

In the laser device of this embodiment, when the preform for the delivery fiber 50 is manufactured, there is no need to perform fine control on the portion to be the refractive-index varying region 56 by gradually changing the amount of the dopant to be added for varying the refractive index in the direction from the inner circumferential side toward the outer circumferential side. Accordingly, controlling the refractive index becomes easier, and the delivery fiber 50 in which the clad 52 has the refractive-index varying region 56 can be easily manufactured.

Although the first through third embodiments of the invention have been described so far by way of examples, the invention is not limited to those embodiments.

For example, in each of the first through third embodiments, the entire delivery fiber 50 is an optical fiber of the invention. However, the invention is not limited to those embodiments. To remove only light reflected from an object to be processed, for example, a conventional optical fiber having a constant refractive index in the radial direction of the clad may be used, instead of the delivery fiber 50 of the first embodiment. An optical fiber of the invention may be then connected to an end of this delivery fiber. The optical fiber of the invention connected to this delivery fiber is several centimeters long. With this arrangement, a special-purpose optical fiber of the invention does not need to be long, and a laser device can be manufactured at low cost.

Further, in the first through third embodiments, the laser devices are fiber laser devices. However, the invention is not limited to them, and the delivery fiber 50 may be used as the delivery fiber of a solid-state laser device, for example.

In the above described embodiments, output light is output from the delivery fiber 50. However, an end cap formed with a glass rod or the like for enlarging the diameter of output light may be provided at the output end of the delivery fiber, for example. In such a case, even if output light is reflected and is input from the end cap, an optical fiber of the invention releases the light input to the clad to the outside of the clad.

In the first through third embodiments, the coating layer 53 may not necessarily be provided, and further, the light releasing member 61 and the heat converting member 62 may not necessarily be provided. In such a case, light that is input to the clad 52 can also be immediately released to the outside of the clad.

In the first and third embodiments, the entire region of the clad 52 serves as the refractive-index varying region 56. However, not all the region of the clad 52 needs to be the refractive-index varying region.

In the third embodiment, the refractive index in the predetermined region adjacent to the core 51 may be constant as in the second embodiment. In that case, the diameter of the predetermined region is also preferably about 2.5 or more times larger than the mode field diameter of light propagating through the core 51 so that the light propagating through the core 51 can be more effectively prevented from leaking into the clad 52.

INDUSTRIAL APPLICABILITY

The invention provides an optical fiber in which light that is input to the clad is easily released to the outside of the clad, and a laser device using the optical fiber.

DESCRIPTION OF REFERENCE NUMERALS

1 . . . laser device
10 . . . seed light source
15 . . . seed light propagation fiber
20 . . . pumping light source
21 . . . laser diodes
22 . . . pumping light propagation fibers
30 . . . amplification optical fiber
31 . . . core
32 . . . clad
33 . . . plastic clad
34 . . . coating layer
40 . . . combiner
50 . . . delivery fiber (optical fiber)
51 . . . core
52 . . . clad
53 . . . coating layer
56 . . . refractive-index varying region
61 . . . light releasing member
62 . . . heat converting member

The invention claimed is:

1. An optical fiber comprising:
a core; and
a clad coating the core,
wherein the clad includes a refractive-index varying region in which a refractive index increases in a direction from an inner circumferential side toward an outer circumferential side, and
wherein, in the refractive-index varying region, the amount of change in the refractive index per unit length in a radial direction is larger on the inner circumferential side than on the outer circumferential side.

2. The optical fiber according to claim 1, wherein
the refractive index gradually increases in the refractive-index varying region.

3. The optical fiber according to claim 1, wherein
the refractive index increases in a stepwise fashion in the refractive-index varying region.

4. The optical fiber according to claim 1, wherein
all the region of the clad is the refractive-index varying region.

5. The optical fiber according to claim 1, wherein
the refractive index is constant in a predetermined region in the clad, the predetermined region being adjacent to the core.

6. The optical fiber according to claim 5, wherein
all the region of the clad other than the predetermined region is the refractive-index varying region.

7. The optical fiber according to claim 1, wherein
at least part of an outer peripheral surface near at least one end of the clad is coated with a light releasing member having a refractive index equal to or higher than a refractive index of the outer circumferential side of the clad.

8. The optical fiber according to claim 7, wherein
the light releasing member is connected to a heat converting member.

9. A laser device comprising
the optical fiber according to claim 1,
wherein output light propagates through the optical fiber.

* * * * *